June 2, 1953
D. H. GRANGAARD
2,640,799
PROCESS OF CONTINUOUSLY UNITING RESIN IMPREGNATED
CELLULOSIC WEBS FOR DECORATIVE COVERINGS
Filed May 19, 1948
3 Sheets-Sheet 1
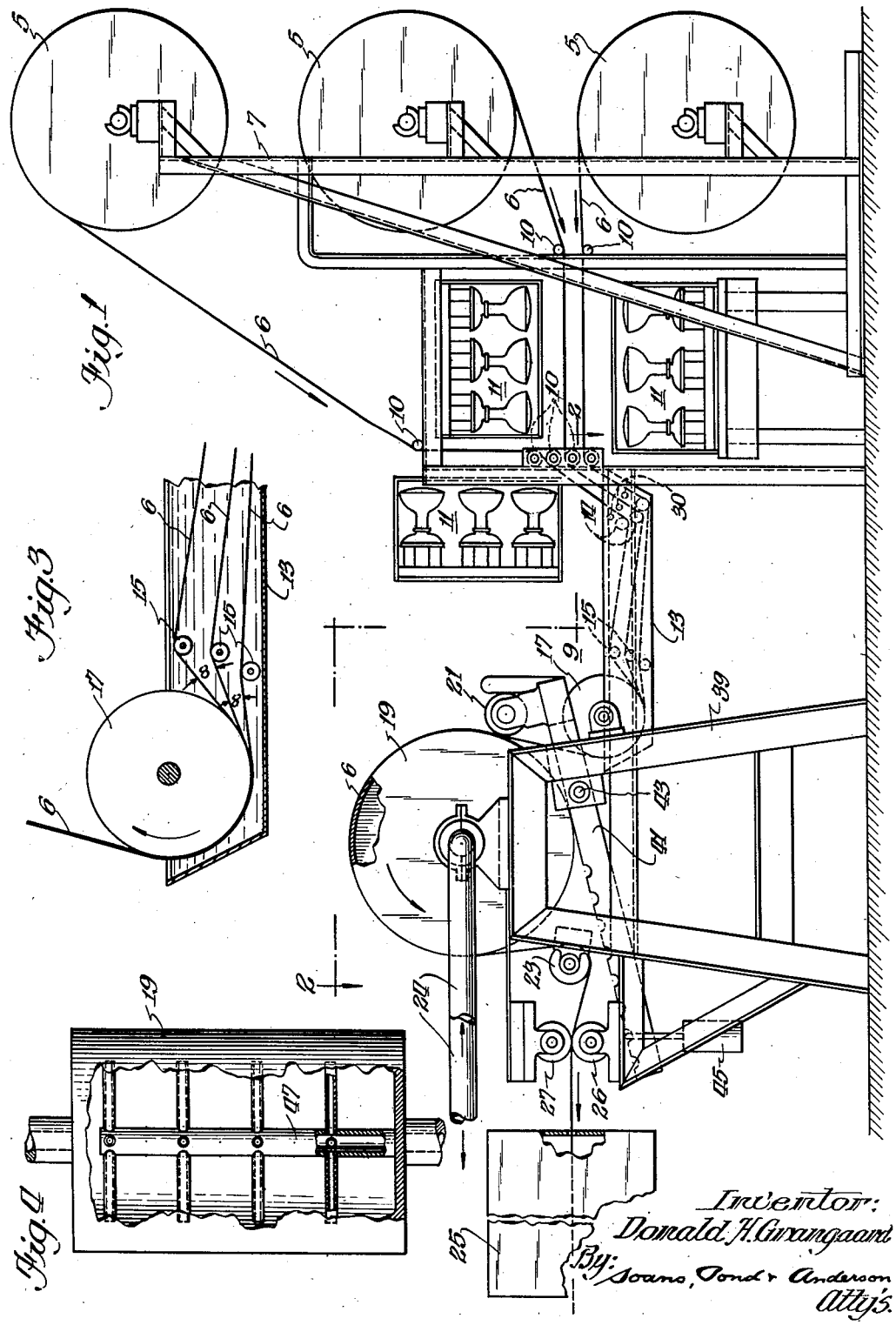
Inventor:
Donald H. Grangaard
By: Soans, Pond & Anderson
Attys.

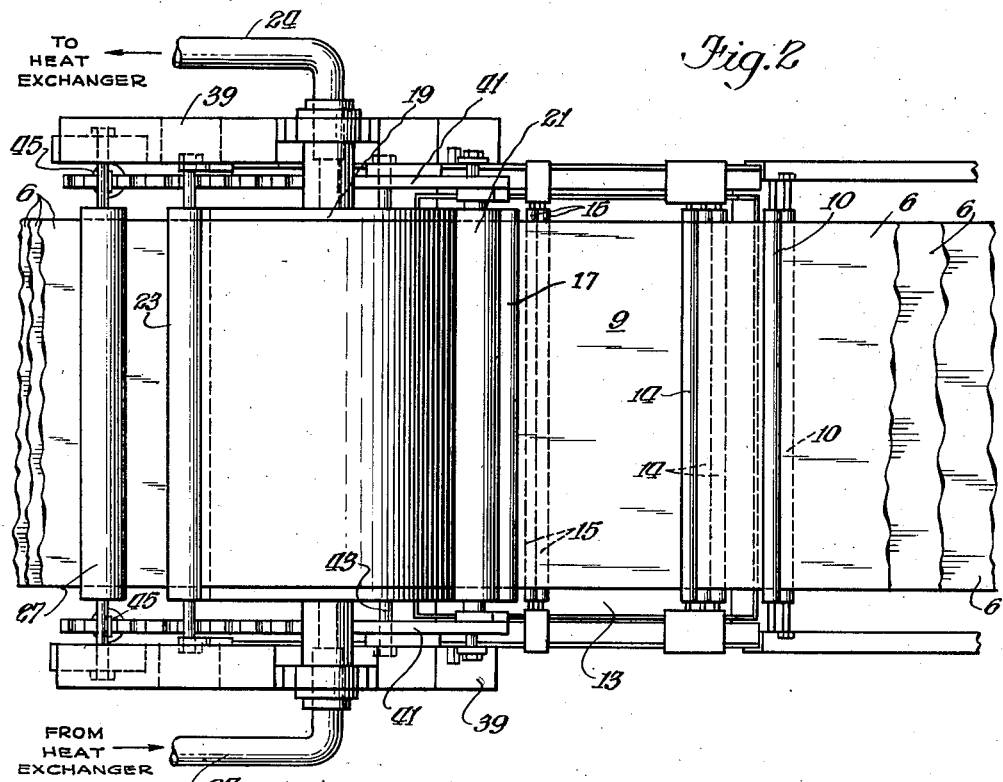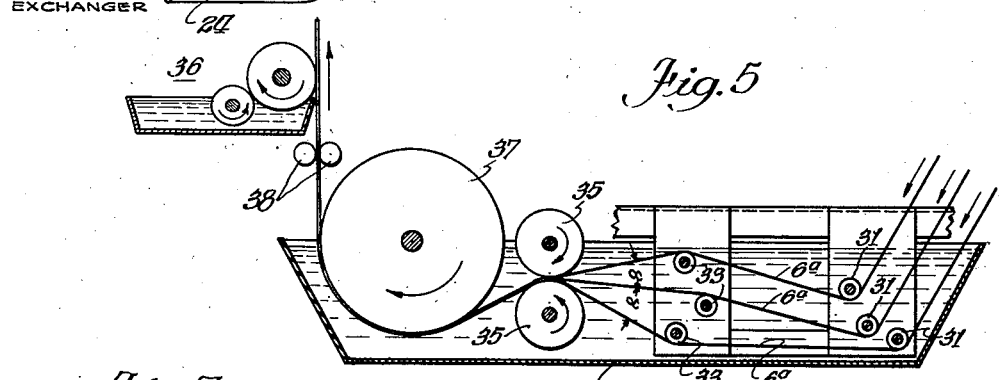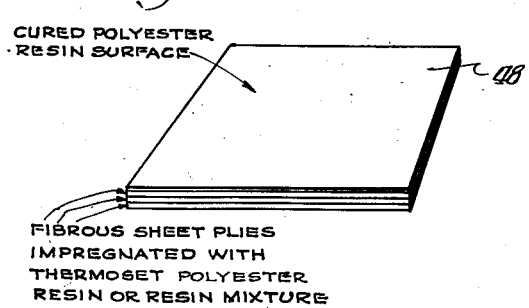

June 2, 1953

D. H. GRANGAARD 2,640,799

PROCESS OF CONTINUOUSLY UNITING RESIN IMPREGNATED
CELLULOSIC WEBS FOR DECORATIVE COVERINGS

Filed May 19, 1948

Inventor:
Donald H. Grangaard
By: Soans, Pond & Anderson
Atty's.

Patented June 2, 1953

2,640,799

UNITED STATES PATENT OFFICE 2,640,799

PROCESS OF CONTINUOUSLY UNITING RESIN IMPREGNATED CELLULOSIC WEBS FOR DECORATIVE COVERINGS

Donald H. Grangaard, Appleton, Wis., assignor to Paper Patents Company, Neenah, Wis., a corporation of Wisconsin Application May 19, 1948, Serial No. 27,977

11 Claims. (Cl. 154—138)

The present invention relates to resin impregnated, laminated, sheet products, and has particular relation to processes for manufacturing products of this general class in continuous sheets or strips by the use of contact or low pressure resins.

Contact or low pressure resins, commonly called contact pressure resins, constitute one of the more recent developments in the resin art. These resins are cured by a true polymerization reaction and are characterized by the property that they cure, in the presence of heat or other activating agency, while subjected to very low or mere contact pressures. In other words, these resins change from the liquid or semi-liquid uncured state into a hardened or cured state, without the liberation of any vapor or gas, and as previously noted, this reaction can be effected without the use of pressure. Usually a catalyst such as benzoyl peroxide is employed to obtain better control of the curing reaction. The strength and other characteristics of the resultant products are comparable to similar products manufactured by the use of phenol-aldehyde and similar resins under high pressure conditions.

Contact pressure resins are included in the group of resins known as thermo-setting resins, which is to say that the curing reaction is irreversible in character and once the resin has hardened it will not return to its original fluid state upon heating. It must be understood, however, that the terms "cured" and "thermoset" as applied to such resins are relative terms which are somewhat difficult of exact definition. Generally stated, and as the terms are used in this application, a contact pressure resin is "cured" or "thermoset" when the polymerization reaction has proceded to such a point that the resin will retain the impression of a surface or mold against or in which the resin is cast. The relative hardness of the resin at the surface or in the body of the casting can, of course, be increased by further curing, but until the surface or shape becomes, in effect, set against further flow to any substantial degree the resin is not cured or thermoset as those terms are intended herein.

At the present time, the known contact pressure resins are all unsaturated polyester resins. This group of resins include the reaction products of unsaturated poly-basic acids, such as maleic, with saturated polyhydric alcohols or with unsaturated polyhydric alcohols, and the reaction products of saturated poly-basic acids with unsaturated polyhydric alcohols. Unsaturated polyester resins are available as high viscosity liquids (2,000 to 65,000 centipoises at room temperature), as low viscosity liquids (10 to 500 centipoises at room temperature), and in a solid or paste form. Some of the contact pressure resins are monomers, for example the resin sold by the DuPont Company under the grade or class name BCM monomer.

Due to the fact that contact pressure resins make possible the production of strong, laminated, sheet products having hard, moisture and reagent resistant finishes, without the use of substantial pressure during the resin curing operation, these resins adapt themselves particularly for the manufacture of resin impregnated sheet products by continuous operations, and various procedures have been proposed for manufacturing such products in this manner. These prior art procedures have not, however, been completely satisfactory, particularly when efforts were made to manufacture laminated, sheet materials, having polished, ornamental or decorative surfaces suitable for use as wall coverings, table tops, etc.

The principal object of the present invention, therefore, is to provide an improved process for the manufacture of resin impregnated sheet products in continuous sheets or strips, and particularly, for the manufacture of such products for ornamental and like uses, by procedures which involve the use of contact pressure resins. As will hereinafter appear, this object is accomplished by a laminating procedure involving a number of novel steps, which include preliminary drying and treatment of the sheets to be laminated, an impregnating operation involving several critical factors, and a curing operation which effects the production of the desired finish and the curing of the impregnating resin, all as a continuous operation. The process also makes possible the provision of certain novel types of resin impregnated sheet products, and these products constitute a further important part of the invention.

The features of certain combination treating, impregnating, and curing apparatus, particularly designed for carrying out the process of the present invention are illustrated in the accompanying drawings, wherein:

Figure 1 is a side elevational view of one embodiment of the apparatus;

Figure 2 is a fragmentary plan view taken on the general line 2—2 of Figure 1;

Figure 3 is an enlarged, fragmentary view, illustrating certain details of the apparatus shown more completely in Figures 1 and 2;

Figure 4 is a plan view, partially in section, of the curing drum which constitutes a part of the apparatus;

Figure 5 is an enlarged, fragmentary view, illustrating a modified type of impregnating apparatus, suitable for use in the practice of the present invention;

Figure 6 is a side elevational view, similar to Figure 1, illustrating another combination impregnating and curing apparatus particularly adapted for practicing the present invention; and Figure 7 is a fragmentary, perspective view of a sheet product manufactured in accordance with the invention.

In the practice of the process of the present invention, the various sheets of paper or other material which are to be united into the final product, are conveniently contained in suitable supply rolls, such as are ilustrated at 5 in Figure 1, and these rolls are desirably supported upon a roll stand 7, adjacent the impregnating apparatus 9. The roll stand 7 includes means (not shown) for tensioning the paper as it is drawn from each of the rolls 5.

Each of the sheets 6 of paper or other material is conducted first through a heating and drying zone, which may be provided by a plurality of banks 11 of infra-red drying lamps, in order to reduce the moisture content of the sheets 6 to a low value. The sheets are guided through the drying zone by suitable, small diameter, guide rolls 10. This initial drying of the sheets, as has been previously noted, is an important part of the present invention. In the practice of the invention in accordance with the examples hereinafter set forth, it has been determined that the moisture content in all of the constituent sheets should be as low as possible, moisture contents which do not exceed about 1% by weight of the sheets being particularly desirable. In certain instances, however, sheets of higher moisture contents, i. e. up to about 3 to 3½% by weight, can be used.

After leaving the drying zone, the sheets 6 are conducted simultaneously through the resin impregnating apparatus 9, which includes a bath, or series of baths, containing the impregnating resin in liquid condition. In the apparatus illustrated in Figures 1 and 2, a single tray bath 13 is utilized, and the dimensions of the bath are such that substantially complete elimination of air from the individual sheets is effected as the sheets pass therethrough. The individual sheets 6 are held in spaced-apart relationship beneath the surface of the resin contained in the tray 13 by means of suitable guide rolls 14 and 15, or equivalent structure. This aids in accomplishing uniform controlled impregnation of the sheets, and also helps in eliminating air from the sheets, which is of importance in the obtaining of a high quality, final product.

The sheets are kept submerged in the impregnating resin during the entire period of the impregnating operation, and at the exit end of the tray 13 they are brought together, while still submerged, by a combining roll 17, which cooperates with the tensioning means for the individual sheets 6 to bring the sheets into pressure contact with each other. In some cases it has been found helpful to feed the sheets 6 into contact with each other on the surface of the combining roll 17 at a small angle, as illustrated particularly in Figure 3. It has been found that a satisfactory angle between the individual sheets as they approach the combining roll, the angle α of Figure 3, is about 15°. The amount of impregnation is carefully controlled by correlation of the various determining factors of paper characteristics, resin viscosity, rate of movement of the sheets through the impregnating bath, pressure at the combining roll, etc., in order that the final product shall contain the desired percentage of resin. When the finished product is to be used as a decorative covering for walls, table tops, and the like, the impregnation should provide a resin content in the cured sheet of from about 40 to 70% of the weight of the sheet.

Following the impregnating and sheet combining operation, the constituent sheets, which are now in contact with each other, are brought into contact with the heated surface of a rotating, hollow drum 19, which is provided with a polished, or otherwise finished, surface. To obtain continuous, even contact between the surface of the innermost resin impregnated sheet and the drum, the apparatus includes a press, or nip roll 21 which is biased into contact with the drum surface, as illustrated. The combined sheets 6 are held in contact with the surface of the drum 19 by the adhesion of the curing resin to the drum surface, and the cured sheet product is removed from the drum by a take-off roll 23, as illustrated.

The drum 19 is connected to a suitable, thermostatically controlled, heat exchanger system (not shown) by means of suitable piping 24, in order that the surface temperature of the drum surface may be very closely and accurately regulated. During normal operation the surface temperature of the drum 19 is maintained at a value which causes the resin to begin to cure almost immediately after the resin impregnated sheets 6 contact the drum surface. The curing reaction of a polyester resin is an exothermic reaction, and during certain portions of the curing operation, the drum 19 must be able to prevent the surface temperature thereof from exceeding a predetermined safe level. Thus the drum 19 acts as a temperature regulating means, in addition to providing a surface on which the material may be cured, and to assure proper accomplishment of its temperature regulation function, the drum 19 should be constructed so as to have a relatively large heat mass. Also the heat exchanger used in connection therewith should be of sufficient capacity and have a sufficiently accurate control to minimize temperature variation on the drum surface.

The speed of rotation of the drum 19, which determines the rate of movement of the sheets 6 through the apparatus, is usually adjusted to effect substantially complete curing of the resin while the laminated sheets are in contact with the drum. It is possible, however, to remove the product from the drum 19 as soon as the resin in the surface which contacts the drum has been cured sufficiently to retain an impression of the face of the curing drum during subsequent treatment, i. e. as soon as the surface resin has become thermoset, and to complete the curing in an oven or other means. Such an oven is indicated at 25 in Figure 1, and oven temperatures within the range of from about 275° to 325° F. for periods of time of the order of about 4 minutes will be found particularly satisfactory for known contact pressure resins. This procedure permits faster operation of the apparatus, and the subsequent curing of the resin contained in the backing portions of the sheet product does not adversely effect the finish obtained previously on the surface which contacted the drum.

The subsequent curing of the sheet in an oven has the further important advantage that it permits considerable flexibility in the control of the curing reaction. Thus, increased surface hardness, better abrasion resistance, and increased resistance to water or solvent absorption can be obtained by continuing the curing reaction beyond the previously defined thermoset point. In other words, part of the complete curing operation can be effected on the drum and part can be effected in the oven, or when a particularly high degree of cure is desired, the ordinary, regular speed drum cure can be continued to whatever degree is desired in the oven. After leaving the drum, and curing oven, if used, the product may be cut to uniform width by anvil and slitter rolls, 26 and 27, and wound onto a take-up roll or other take-up means.

Various types of single and multiple sheet products can be manufactured by the process of the invention, as outlined above. In general, however, it is desirable to use at least three plies—a facing ply and two or more backing plies—although in some instances, other combinations will be preferable, and the process is of sufficient flexibility that almost any reasonable combination of fibrous and other sheets can be employed. These may include woven and non-woven sheets of cellulosic or of non-cellulosic fibrous materials, such as for example, paper fiber, cotton fiber, fiber glass, etc. As previously noted, the process is particularly applicable to the manufacture of multi-ply, cellulosic sheet products having decorative surfaces suitable for wall coverings, table tops, and the like, and when products of this type are to be made, it will be found advisable to use from about three to five plies.

When manufacturing decorative surface laminates wherein the facing ply of the sheet is to be of a uniform color, for example white, the facing ply will preferably comprise a pigmented, alpha or rag pulp sheet, having a basis weight inclusive of pigment of from about sixty to ninety pounds for five hundred sheets 24 by 36 inches. Such a sheet may be pigmented with zinc sulfide, or equivalent pigment, to the extent of from about 10 to 15% of the total weight of the sheet, and desirably the sheet used for the facing ply is not calendered. The sheet should be, however, of a very high cleanliness type, in order that the surface of the finished product will be free from blemish. The backing plies for decorative laminates of this type preferably comprise non-impregnated, uncalendered sheets having high alpha or rag pulp contents, and desirably have a basis weight of from about ninety to one hundred and twenty-five pounds per five hundred sheets 24 by 36 inches.

If the facing of the laminate is to contain a pattern, the facing sheet will preferably comprise a pigmented, alpha or rag pulp sheet having a basis weight of from about sixty to ninety pounds for five hundred sheets 24 by 36 inches, similar to the facing sheet used for uniform colored sheets, except that this sheet should be at least lightly calendered. The pattern may be applied to the sheet by printing or other means, and in the completed product, it is desirable to employ a transparentizing overlay sheet having a thickness of from three to five thousandths of an inch over the facing sheet. This transparentizing sheet has a high alpha or rag pulp content and becomes substantially transparent when the product is manufactured. Its use has the desirable result of providing a layer of resin over the printed pattern, and this increases the wearability of the product. The backing sheets for the patterned surface laminates are preferably of the same weight and have the same pulp contents as the back sheets for the uniform color products, as described above. All of the constituent plies should, if possible, comprise reasonably absorbent sheets, because polyester resins are non-polar and do not readily wet cellulosic and other fibrous sheets.

So far as our present investigations have shown, decorative laminates and other multi-ply sheet products can be manufactured in accordance with the process of the present invention by the use of any of the available low viscosity, polyester, low-pressure resins, and by various mixtures or combinations of those resins. In the continuous manufacture of decorative laminates by the use of high alpha or high rag pulp content facing and backing sheets as described above, polyester resins having a viscosity within the range of from 5 to 500 centipoises at room temperatures are greatly preferred in order to obtain thorough impregnation of the sheets. The resin contents in these products should be within the range of from about 40 to 70 percent of the total weight of the cured resin-containing sheet.

Prior to the impregnating of the several constituent sheets with the polyester resin or resins, the moisture content of each of the sheets is reduced to a low value. The dried sheets should pass into the resin impregnating bath as soon as possible after leaving the drying zone to prevent moisture pick-up. This may result in undue localized heating of the resin, with possible precuring of some resin. To avoid this difficulty, the resin may be circulated through a temperature controlling heat exchanger, or cooling coils, as indicated at 30 in Figure 1, may be provided in the resin pan.

Also, as previously noted, the resin impregnation should be effected under conditions whereby there is complete removal of any air which might be entrapped in the sheet. The removal of entrapped air may be accomplished by moving the sheets through a relatively long bath of resin, which is desirably as deep as possible, while the sheets are held apart from each other, and then bringing the sheets into close contact with each other, as by the use of combining or squeeze rolls, while they are still submerged beneath the surface of the resin. The use of spacer bars in the resin bath will also aid in effecting removal of entrapped air. The required removal of air from the sheets which are to be laminated may, however, be accomplished by other procedures, for example, the impregnated and combined sheets can be rolled and allowed to stand under refrigerated conditions, for periods upwards of twenty-four hours before curing. This essential requirement is that there must be no air-filled pockets in the sheets during curing.

The control of the amount of resin which is contained in the sheets at the conclusion of the impregnating operation and prior to the curing operation is also very important, and in certain instances, it will be found desirable for this purpose to use squeeze rolls located so as to engage the sheets subsequent to their passage through the resin bath. An arrangement utilizing squeeze rolls in this manner is illustrated in Figure 5, in which structure there is provided a pan 29, similar to the pan 13, for containing the resin, submerged guide rolls 31 and 33 for conducting the sheets through the resin, a pair of power-driven, submerged squeeze rolls 35, a guide roll 37, which is similar to the combining roll 17, at the exit end of the pan, and a second pair of power-driven squeeze rolls 38 positioned above the exit end of the resin pan 29. The submerged squeeze rolls 35 are desirably mounted in such manner that the pressure which they exert on the sheets 6a can be accurately controlled, and the shape of the rolls should be such that the pressure will be uniform along the nip. The squeeze rolls 35 aid in eliminating air from between the sheets; they remove excess resin from between the sheets; and they also act to combine the impregnated sheets. In view of the sheet-combining function, the sheets should be guided into the nip formed between the rolls 35 in such manner that the angle between the adjacent sheets, the angle $a$ in Figure 5, will be at least equal to about 15°. If the angle $a$ is less than this, difficulty will be experienced in effecting complete elimination of entrapped air from between the sheets, as described above in connection with the guide rolls 15 and the combining roll 17. The press rolls 38 should also be adjustably mounted, and these rolls, as previously noted, remove excess resin from the surface of the combined sheets and can be used to effect very accurate control of the resin content in the combined sheets.

It is also desirable, in some instances, to apply a surface coating of resin to the combined sheets immediately before the sheets are brought into contact with the surface of the curing drum 19. This can be accomplished by a reverse roll coater, such as is illustrated at 36 in Figure 5, or by other known types of coaters. The surface coating of resin which is applied by this coater may be of different composition from the resin which is contained in the main impregnating pan 27. When a surface coating is to be applied, it will generally be found advisable to remove from the combined sheets any excess resin which may be carried from the impregnating pan 29. This can be conveniently accomplished by a pair of press or squeeze rolls such as the rolls 38.

When the combined resin bearing sheets are brought into contact with the surface of the drum 19, it is important that the pressure which is applied by the nip roll 21 shall be uniform across the surface of the drum, and it is desirable that the apparatus include means whereby this pressure can be varied for different types of sheets and for different types of resins. In the illustrated apparatus, the nip roll 21 is hingedly mounted upon the frame 39, which supports the curing drum 19, by a pair of bell crank levers 41, which are hingedly mounted on the frame 39 intermediate their ends by a suitable cross shaft 43. Weights 45, which may be adjustably positioned along the length of the bell crank levers 41 permit close control and adjustment of the nip pressure. In the manufacture of decorative laminates of the general type described above, it will be found desirable to operate with a nip pressure of the order of from about 1 to 30 pounds per linear inch along the line of contact of the nip roll 21 with the laminate and the drum surface. This rather considerable variation in the permissive nip pressure results from the fact that the pressure used depends in part on the speed of operation, the tension in the sheets, the percent resin content, the viscosity of the resin or resins used, and the amount of pressure applied to the sheets by the squeeze rolls, if such rolls are used.

The curing drum 19 in the particular apparatus illustrated in the drawings, is a chrome-plated, cast iron cylinder, which is 24 inches in diameter and which has a 37 inch face. The wall thickness of the drum is about ½ inch. The surface of the drum is ground to approximate the finish of a Number 4 caul plate, a Number 4 finish, as the term is used in the art, being a smooth finish, having fine, discontinuous parallel lines ground into the surface for the purpose of breaking up light reflections, so as to reduce the gloss.

In order to aid in obtaining even temperature distribution on the surface of the drum, the inflow for the heat exchanger liquids may comprise a branched distributor, as is illustrated at 47 in Figure 4. The temperature which is maintained at the surface of the drum 19 will be determined primarily by the gel point temperature of the impregnating resin or resins; the temperature at which the curing reaction begins to proceed at a reasonably rapid rate being generally designated the "gel point" of the resin. The known low viscosity polyester resins have gel points of the order of from about 190° to 215° Fahrenheit, and to cure such resins or mixtures thereof, the drum should be heated so as to have a surface temperature which is from about 15 to 60 degrees above the gel point, i. e. from about 205° to 275° Fahrenheit, in the region of the nip roll 21.

Due to the exothermic character of the curing reaction, the temperature of the laminate in the region where the resin curing is in progress, unless controlled, may rise to a value of the order of from 300° to 335° F. To prevent this, the drum, as previously noted, should have a large heat mass to assure that excessive temperature increases in the laminate with resultant injury to the resin shall be prevented. The effectiveness and accuracy of the temperature regulator is also an important factor in preventing over-heating of the resin during its cure.

As soon as the resin at the surface of the laminate or other product has set, it is usually possible to strip the product from the drum surface. However, the use of a lubricant which may be added to the resin or applied to the surface of the drum, or both, is recommended if the product shows any tendency to stick to the drum surface. Known plastic lubricants such as the silicone lubricants and the wax-like lubricant materials such as vegetable lecithin have been used successfully. Usually an amount of lubricant equal to about ¼ of 1% of the weight of the uncured resin will be found satisfactory.

As previously noted, the impregnation of the individual sheets can be accomplished by the use of more than one bath of resin, and a combination impregnating and drum-curing apparatus utilizing such an arrangement is illustrated in Figure 6. The apparatus of Figure 6 also includes additional means for effecting the combining of the resin impregnated sheets prior to their application to the curing drum and for controlling the resin content in such sheets.

The apparatus illustrated in Figure 6 includes two trays or pans 49 and 51 for containing two differing types of impregnating resins. The resin pans 49 and 51 are supported upon a suitable frame structure 53, which may be fabricated from channel and other structural sections, as illustrated. It is intended that the apparatus be used in conjunction with means for reducing the moisture content of the individual sheets to a low value, as previously described, and it will be understood that the individual sheets 55 which are to be laminated are dried at least to a moisture content which is lower than about 3½% of the weight of the sheets before passing into the impregnating resins. Preferably, the moisture content of each of the sheets is reduced to a value which is not greater than 1% of the weight of that sheet. The sheets 55 are guided into the right hand end of the first resin pan 49 by means of suitable guide rolls 57 supported upon the frame 53 and are guided through the pan by additional guide rolls 59 contained within the pan 49. As each of the sheets 55 emerges from the resin pan 59, it passes over a pair of scraper bars 61, which remove excess resin from both sides of the sheet. The sheets 55 are then guided into the second resin pan 51 by suitable guide rolls 63, which may be adjustably supported on the frame 53.

The second resin pan 51 includes a press roll 65, which is similar to the roll 17 in the Figure 1 structure, for the purpose of pressing the individual sheets 55 into contact with each other while the sheets are below the surface of the resin in the second resin pan. The angle at which the sheets are guided into contact with each other is about 15°, as in the previous arrangements. Also, as in the previous arrangements, it is essential that the sheets be combined under conditions which will effect substantially complete elimination of air bubbles from between the sheets.

After emerging from the second resin pan, the combined sheets 55 are conducted through a pair of power-driven press or squeeze rolls, illustrated at 67. The rolls 67 accomplish the dual function of further combining the sheets 55 and of controlling the resin content of the combined resin-impregnated sheets as they pass onto the curing drum 69. The power-driven press rolls 67 are normally operated at a peripheral speed which is less than the peripheral speed of the drum 69 (which is also the linear speed of the combined sheets), and the second resin pan is provided with an extension 71 for collecting and returning excess resin removed by the rolls 67 to the pan 51. Variation in the peripheral speed of the press rolls 67 relative to the linear speed of the sheets 55 provides an effective method of adjusting the resin content of the sheets. Generally, the rolls 67 will be driven at a peripheral speed which is from about one third to two thirds of the linear speed of the sheets. Also during the operation of the apparatus, it has been found desirable to carefully adjust the pressure exerted by the power-driven rolls 67, and to this end the apparatus includes a micrometer screw adjustment 73 at each end of the upper roll for determining roll pressure. In the illustrated apparatus, press rolls 67 are polished, uncrowned rolls about 5½ inches in diameter. The power-driven rolls 67 and the associated support structure are supported upon the frame support 75 for the curing drum 69 by means of a triangularly-shaped, sub-frame 77 which may be fabricated from angle sections or the like.

The curing drum 69 is mounted on the frame 75 by means of suitable bearings 79, similar to the Figure 1 structure, and piping 81 is provided for connecting the interior of the drum with a heat exchanger system for controlling the drum temperature, as in the previously described embodiment. The drum 69 may be exactly similar to the drum 19 previously described, and also similarly to that drum, it should be capable of preventing the temperature of the laminate being cured thereon from exceeding a predetermined safe level during the curing operation.

Following the impregnating and sheet combining operation, the combined sheets 55, which are now impregnated with the uncured resin picked up from the resin pans 49 and 51, are pressed into contact with the surface of the curing drum 69 by means of a press roll 83. The roll 83 is supported so as to be movable toward and away from the surface of the drum 69 by means of a pair of spaced-apart bell crank levers 85, similar to the corresponding elements 41 in the Figure 1 structure. The bell crank levers 85 are hingedly connected to the frame 75 by means of bearing and bearing supports 87, and the pressure exerted by the press roll 83 is controlled by means of adjustable weights 89 which can be moved along the free end of each of the bell crank levers 85.

It will be noted that the direction of rotation of the drum 69 is opposite to the direction of rotation of the drum 19. This results in the combined sheets 55 passing under the center of the curing drum instead of over the center as in the Figure 1 apparatus. Either arrangement may be used with little difference in the end result.

The cured sheet product, which is indicated at 55a, is removed from the curing drum 69 by means of a take-off roll 91 which may be positioned opposite the press roll 83, as shown in full in Figure 6, or the take-off roll may be positioned as indicated by the dotted outline 91a. This latter arrangement permits the cured product 55a to be drawn back over the other portions of the apparatus, which is helpful in conserving space, and in addition, it permits the product to remain in contact with the surface of the curing drum 69 for the maximum possible period of time. The take-off roll 91 is supported upon a suitable extension 93 of the frame 75, which also serves as a support for the slitter and anvil rolls 95 and 97. The rolls 95 and 97 are similar to the rolls 25 and 27 in the Figure 1 structure, and are provided for trimming the product to size as it leaves the curing drum.

It will be understood that the sheet product 55a can be removed from the curing drum 69 as soon as the resin in the surface which contacts the drum has been cured sufficiently to retain an impression of the face of the curing drum, and that the sheet may then be directed into an oven, such as the oven 25 previously described, to complete the cure of the resin throughout the several sheets.

The apparatus illustrated in Figure 6 has the particular advantage that it permits the use of two different types of resins (or resin mixtures) during the impregnating operation. For example, the first impregnating pan 49 may desirably contain a low viscosity resin having a viscosity of from about 50 to 100 centipoises and the second resin pan 51 may advantageously contain a resin having a viscosity within the range of from about 250 to 500 centipoises. The use of a low viscosity resin in the initial pan aids in accomplishing good impregnation of the sheet and more effective removal of air, while the higher viscosity resin in the second pan increases the amount of resin which can be provided in the final product and results in better finishes of greater wear and abrasion resistance. When lubricants are used with a series of baths of differing impregnating resins, it is usually preferable to add the lubricant to the final bath of resin.

In certain instances, in the practice of the invention, it may be found advantageous to use one or more sheets which are not impregnated with resin, and such an arrangement is illustrated in Figure 6. As there shown, a sheet of fibrous material, indicated at 99, which may be a sheet of paper or a sheet of a woven or felted fabric, can be conducted directly into the press rolls 67 without passing through the resin pans 49 and 51. The sheet 99 is combined with the sheets 55 as it passes through the press rolls 67, and will be attached thereto so as to become an integral part of the laminate during the resin curing operation. Unimpregnated sheets can also be combined with impregnated sheets by the use of the apparatus illustrated in the other figures of the drawings. The actual combining can be there effected at the nip of the press roll 21 and the drying drum 19, or at some other convenient location. Usually it will be found advisable when using an unimpregnated sheet (or sheets) to combine that sheet with the resin-impregnated sheets in such manner that the unimpregnated sheet will be disposed at the back or within the resulting laminate. This can be accomplished in the Figure 6 apparatus by reversing the direction of rotation of the curing drum 69 and by applying the combined sheets to the drum in the same manner as in the Figure 1 apparatus.

Example I

In the manufacture, by the process of the invention, of a three ply, uniform color, decorative covering for wall and table surfaces, the face sheet consisted of a zinc sulfide, pigmented sheet of high alpha pulp content, having a basis weight of 80 pounds per ream of 500 sheets 24 inches by 36 inches. The two backing sheets were non-pigmented sheets; they also were of high alpha pulp content, and had a basis weight of 115 pounds per ream of 500 sheets 24 inches by 36 inches. The three sheets were dried prior to impregnation by passage through the infra-red driers 11, as previously described, and were all conducted through a single bath of a polyester resin, also in the manner described. The resin used consisted of a mixture of 75 parts by weight of a polyester resin which is sold under the grade or class name of "Selectron #5040," and 25 parts by weight of a monomer, sold under the grade or class designation of "BCM-monomer." As a catalyst, 2 parts by weight of benzoyl peroxide were added to the mixture of 75 parts by weight of the resin and 25 parts by weight of the monomer. The mixture as used has a viscosity of approximately 50 centipoise at 75° F.

Selectron resins are polyester resins and are described by the manufacturer as thermosetting compositions consisting of a mixture of an unsaturated polyester resin with styrene, an allyl ester, a vinyl ester or other polymerizable, ethylenic, unsaturated compound. The unsaturated polyester portion which comprises from 30% to 90% of the composition is produced by esterification of maleic or fumaric acids alone or mixed with saturated or aromatic dibasic acids and a glycol or polyglycol or a mixture thereof. Selectron resins polymerize at low or contact pressures (i. e. less than 10 pounds per square inch) and at relatively low temperatures, i. e. from about 220° to 240° F. The compounds polymerize or condense with cross linkages in three dimensions.

Selectron resins are manufactured by the Pittsburgh Plate Glass Company of Milwaukee, Wisconsin, and are commercially available in various viscosity ranges. As above noted, Selectron polyester resins contain styrene as a co-polymer and as a diluent. Selectron #5040 is a low viscosity type, polyester resin, having a viscosity at 75° F. of about 65 centipoises.

The product designated as BCM-monomer is a methacrylic acid derivative manufactured by the E. I. du Pont de Nemours and Company. BCM-monomer is thermosetting and can be described as a methacrylate having a poly-functional group. Methyl-methacrylate contains a single functional group and is thermoplastic while a poly-functional group such as is included in BCM-monomer results in a methacrylate having thermosetting properties. BCM-monomer is believed to be properly described as tetra-ethylene glycol dimethacrylate. In the uncured state, it is a low-viscosity fluid having a viscosity of approximately 10 centipoises at 75° F.

During the manufacturing operation, which was carried out on apparatus similar to that illustrated in Figures 1 and 2, the paper sheets were drawn through the bath of resin at a speed of about two feet per minute, and they were in contact with the drum surface for a period of approximately one-half revolution, the drum being heated to produce a surface temperature at the nip or press roll 21 of approximately 235° F. The length of the path of movement of the sheets through the resin averaged about two feet and this was found to be ample for the purpose of effecting substantially complete removal of air from the sheets during the impregnating operation. The combining of the sheets was effected in the resin bath by action of the combining roll 17 and by keeping the paper sheets under slight tension. The individual paper plies were guided into contact with each other with a divergence angle (the angle $a$ of Figure 3) of approximately 15 degrees. The combined, superposed paper sheets, after leaving the combining roll 17, were pressed into contact with the surface of the curing drum 19 by the nip roll 21 with a linear nip pressure of the order of about five pounds per linear inch.

The sheets were moved into the resin bath immediately after passing through the banks 11 of infra-red driers to prevent a re-pickup of moisture. The passage of the heated sheets into the resin bath was observed to result in some localized heating of the resin and to overcome the resulting tendency to cause setting-up of the resin in the pan, it was found advisable to circulate the resin from the pan through cooling coils (not shown).

The final product contained about 45 per cent by weight of the impregnating resin. The cured resin surface on the face sheet had good wear and solvent resistance properties, and the surface of the backing sheet was particulaly adapted to receive adhesives for joining the product to the material with which it might be used. This product is illustrated at 48 in Figure 7, and when finally cured, it had a thickness of approximately 30 mils.

Example II

In the manufacture, by the process of the invention, of a decorative covering having a printed pattern in the surface sheet, the procedure followed was generally similar to that described above. In this example, however, four plies were used, the outermost or face sheet consisting of a three-mil sheet of high alpha pulp content, which is known to the trade as a transparentizing layer. The printed pattern sheet consisted of a lightly calendered, high alpha pulp sheet having a basis weight of 80 pounds, per ream of 500 sheets 24 by 36 inches and containing approximately 15% by weight of zinc sulfide pigment. The face of this sheet was printed with a linen pattern. The third and fourth plies served as backing sheets and consisted of two sheets of the 115 pound, non-pigmented, high alpha pulp content, sheet described above. The resin content of the resulting laminate was approximately 47%. During the curing operation, the transparentizing layer becomes almost completely transparent, and in the final product, it gives the appearance of depth to the design which is printed on the intermediate layer. Also, it protects the design from wear during use of the material

*Example III*

In the manufacture of another example of the product of the invention by the apparatus illustrated in Figure 1, sheets of the same general type described in connection with Example I were used. These three sheets were dried to a moisture content of less than 1% by weight, prior to impregnation, by passage into the infra-red driers 11, as described, and were conducted through a single bath of a polyester resin by operation of the illustrated apparatus. The resin used consisted of a mixture of 75 parts by weight of a polyester resin which is sold under the grade or class name of Selectron #5040 and 25 parts by weight of a monomer sold under the grade or class designation of BCM-monomer. As a catalyst, two parts by weight of benzoyl peroxide were added to the mixture of the polyester resin. Selectron #5040 has a viscosity of from about 50 to 75 centipoises at 75° F., and the final mixture had a viscosity of approximately 50 centipoises at 75° F.

During the manufacturing operation, the three sheets of resin-impregated paper were in contact with the surface of the drum 19 for approximately ½ revolution, the drum being heated to produce a surface temperature at the nip or press roll 21 of approximately 245° F. The speed of rotation of the drum was such that the period of contact with the surface of the drum effected thermosetting of the resin in contact with the surface of the drum, but it did not effect the complete curing of the resin in the remaining portions of the product. After leaving the drum, the combined sheets were conducted through an oven as indicated at 25 in Figure 1, which was heated to a temperature within the range of from about 275 to 325° F., and the product was retained in the oven for a period of approximately four minutes, the oven 25 having a length of about 100 feet. The laminated sheet product resulting from this procedure was found to have increased surface hardness, abrasion resistance, and increased resistance to water pick-up and solvents, as compared with the product of Example I, wherein the cure was effected entirely on the curing drum. Presumably, this resulted from the fact that it was possible to carry the curing reaction beyond the point at which the resin is normally considered cured or thermoset.

*Example IV*

In the manufacture of a multi-ply, laminated sheet product in accordance with the invention by the use of apparatus illustrated in Figure 6, a particularly useful product of the decorative surface type was obtained by the combination of a pigmented face sheet, a transparentizing overlay, and two backing plies. As in the previously described examples, the transparentizing overlay consisted of a three-mil sheet of a high alpha pulp content. The face sheet, which underlies the transparentizing overlay consisted of a three-mil sheet of a high alpha pulp content. The face sheet, which underlies the transparentizing overlay, comprised a pigmented, lightly calendered sheet of high alpha pulp content having a basis weight of about 65 pounds per ream of 500 sheets 24 by 36 inches, and having a decorative pattern printed on the face of the sheet. The other two plies were of relatively heavy, non-pigmented, high rag content sheets having a basis weight of about 115 pounds per ream of 500 sheets 24 by 36 inches.

It was found advisable to use a resin in the first impregnating section having a viscosity within the range of from about 50 to 100 centipoises at 75° F. Selectron resin #5040 alone or the BCM-monomer alone, or Selectron resin #5001 alone, and mixtures of these resins are suitable, low viscosity, polyester resins for this section. Selectron resin #5001 is generally similar chemically to Selectron resin #5040, previously described, and both resins have a viscosity at 75° F. within the range of from about 50 to 75 centipoises.

In the high viscosity section of the impregnating means, it was found advisable in the manufacture of this particular embodiment of the invention, to use a resin having a viscosity within the range of from about 250 to 500 centipoises at a temperature of 75° F. Mixtures of the high viscosity polyester resin sold under the grade or class name of Selectron #5051 with equal parts of Selectron resin #5040 were found particularly satisfactory with the sheets described above. Selectron resin #5051 has a viscosity at 75° F. of approximately 1500 centipoises. The mixture had a viscosity of approximately 250 centipoises at 75° F.

The combined sheets were moved through the resin baths at a linear speed of approximately 1.5 feet per second. The curing drum 69 was heated so as to maintain a temperature of approximately 245° F. at the nip provided by the press roll 83, and the sheets were removed from the drum after being in contact therewith for a little over ½ revolution of the drum. For linear speeds within the range of about 12 to 24 inches per minute, a substantially complete cure of the resin was effected on the drum 69. Here again, it was found that the operation could be speeded up by restricting the cure obtained on the curing drum to the resin in contact with the surface of that drum, and completing the curing in an oven similarly to the process set forth in Example III.

The process of the invention as described above makes possible the continuous manufacture of resin impregnated, laminated sheet materials, and particularly, laminates for decorative purposes, of much higher quality and at a much lower cost than has heretofore been possible. The process includes a number of important and novel steps which contribute in large measure to its success. These include the drying of the constituent sheets to a moisture content of not over about 3 to 3½%, and preferably less than 1%, prior to the resin impregnating operation, the complete elimination of air from the sheets during the impregnating operation, and the combining of the impregnated, uncured sheets, prior to the application of those sheets to the drying or curing drum, under conditions which eliminates substantially all air from the sheets and from between the sheets and the drum surface. The use of a drum for effecting the complete or partial curing of the resin is a very important feature of the invention, and as previously emphasized, this drum must be capable of accomplishing accurate and positive control of the temperature of the resin during the curing operation. The process makes possible the manufacture of a number of novel sheet products having important advantages over the products heretofore known in the art. Various of the features of the invention believed to be new are set forth in the appended claims.

I claim:

1. The process of manufacturing, as a continuous operation, an extended length of laminated, sheet material containing a thermoset resin of the unsaturated polyester type, which comprises the steps of drying a plurality of webs of fibrous material, impregnating said webs with a low viscosity, polyester resin which said resin is in the reacted, liquid state, effecting substantially complete removal of air from said webs, adjusting the resin content of said webs to a predetermined value, bringing said webs into superposed relationship with each other, pressing the superposed webs into immediate contact with a heated surface of large heat mass, maintaining said superposed webs in adherent contact with said surface, at least until the resin in contact with said surface is thermoset, and finally removing the sheet material from said surface.

2. The process of manufacturing, as a continuous operation, an extended length of laminated sheet material containing a thermoset resin of the unsaturated polyester type, which comprises the steps of drying each of a plurality of webs of cellulosic sheet material to reduce the moisture content of said webs to a value which is less than about 3½% by weight of the dried web, impregnating said dried webs with low viscosity, polyester resin by a procedure which includes submerging said webs in, and moving said webs through, a bath of said resin which is in the unreacted state, said resin having a viscosity at 75° Fahrenheit of about 50 to 65 centipoises and having a gel point in the region of from about 190° to 215° Fahrenheit, said webs being moved through said resin at such speed that substantially complete removal of air from said webs is accomplished while said webs are submerged in said resin, adjusting the resin content of said webs to a predetermined value by the use of pressure or squeeze rolls while said webs are submerged in said resin bath, said squeeze rolls serving the further function of bringing said webs into superposed contact with each other while said webs are submerged in said resin bath, conducting said superposed webs from said resin bath into adherent contact with the surface of a revolving, heated drum, said superposed webs being pressed into the surface of said drum by a nip roll, and said drum having a surface temperature in the region of said nip roll which is from about 15 to 60° Fahrenheit above the gel point temperature of the impregnating resin, maintaining said superposed webs in adherent contact with said drum at least until the resin in contact with the surface of said drum is thermoset, and finally removing the laminated sheet material from said drum.

3. The process of manufacturing, as a continuous operation, an extended length of a laminated, sheet material containing a thermoset resin of the unsaturated polyester type, which comprises the steps of drying a plurality of webs of fibrous material, impregnating said webs with a low viscosity, polyester resin while said resin is in the unreacted, liquid state, effecting substantially complete removal of air from said webs, adjusting the resin content of said webs to a predetermined value, bringing said webs into superposed relationship with each other, pressing the superposed webs into adherent contact with a revolving, heated drum, maintaining said superposed webs in adherent contact with said drum until the resin in contact with the surface of said drum is thermoset, forcibly removing the sheet material from the drum, and passing the sheet material through a heated oven to complete the curing and effect the thermosetting of the remainder of the resin in said material.

4. The process of manufacturing, as a continuous operation, an extended length of a laminated sheet material containing a thermoset resin of the unsaturated polyester type, which comprises the steps of drying each of a plurality of webs of fibrous material to a moisture content which is less than about 3½% by weight of the web being dried, impregnating the said dried webs with a low viscosity polyester resin by a procedure which includes submersion of said webs in a bath of said resin which is in the unreacted state, the resin in said bath having a viscosity at 75° Fahrenheit within the range of from about 5 to 500 centipoises, and said webs being moved through said resin under such conditions that substantially complete removal of air from said webs is accomplished while said webs are submerged in said resin, adjusting the resin content of said webs to produce a resin content in the completed sheet material within the range of from about 40 to 70% by weight, bringing said webs into superposed contact with each other while said webs are submerged in said resin bath, conducting said superposed webs from said resin bath into adherent contact with the surface of a revolving, heated drum, maintaining said superposed webs in adherent contact with said drum until the resin in contact with the surface of said drum is thermoset, removing the laminated sheet material from said drum and passing said sheet material through an oven which is heated to a temperature within the range of from about 275° to 325° Fahrenheit, the sheet material being held in the oven at least until all of the resin contained therein is thermoset.

5. The process of manufacturing, as a continuous operation, an extended length of a laminated, sheet material containing a thermoset resin of the unsaturated polyester type, which comprises the steps of drying a plurality of webs of fibrous material, impregnating the dried webs with low viscosity polyester resin while said resin is in the unreacted liquid state by a multi-step operation which includes passing said webs through a bath of uncured resin having a viscosity at 75° Fahrenheit within the range of from about 50 to 100 centipoises, and subsequently passing said webs through a second bath of uncured resin having a viscosity at 75° Fahrenheit within the range of from about 250 to 500 centipoises, effecting substantially complete removal of air from said webs, adjusting the resin content of said webs to a predetermined value, bringing said webs into superposed relation with each other, pressing the superposed webs into adherent contact with a revolving, heated drum, maintaining said superposed webs in adherent contact with said drum at least until the resin in contact with the surface of said drum is thermoset, and finally forcibly removing the sheet material from the drum.

6. The process of manufacturing, as a continuous operation, an extended length of a laminated, sheet material containing a thermoset resin of the unsaturated polyester type, which comprises the steps of drying each of a plurality of webs of fibrous material to reduce the moisture content of said webs to a value which is less than about $3\frac{1}{2}\%$ by weight of the dried web, impregnating said dried webs with low viscosity, polyester resin by a multi-step procedure which includes submerging said webs in, and moving said webs through, a first bath of resin, which is in the unreacted state and which has a viscosity at 75° Fahrenheit within the range of from about 50 to 100 centipoises, and then submerging said webs in, and moving said webs through, a second bath of resin which is also in the unreacted state and which has a viscosity at 75° Fahrenheit of 250 to 500 centipoises, said webs being moved through said resin baths at such speed and under such conditions that substantially complete removal of air from each of said webs is accomplished while said webs are submerged in said resin, adjusting the resin content of said webs to a predetermined value, bringing said webs into superposed contact with each other while submerged, conducting said superposed webs into adherent contact with the surface of a revolving, heated drum, maintaining said webs in adherent contact with said drum at least until the resin in contact with the surface of said drum is thermoset, and finally removing the sheet material from said drum.

7. The process of manufacturing, as a continuous operation, an extended length of a laminated sheet material containing a thermoset resin of the unsaturated polyester type, which comprises the steps of drying a plurality of webs of fibrous material, impregnating said dried webs with a low viscosity, polyester resin by a procedure which includes submersion of said webs in a bath of said resin which is in the unreacted liquid state, adjusting the resin content of said webs to a predetermined value, and effecting positive removal of air from between said webs by conducting said webs, immediately following their emergence from the bath of impregnating resin into and through the nip provided by a pair of squeeze or press rolls, said webs having an excess of resin thereon when they pass into the nip of said rolls and said rolls also acting to press said webs into contact with each other, pressing said webs into adherent contact with a heated surface of large heat mass, maintaining said superposed webs in adherent contact with said surface at least until the resin in contact with the surface is thermoset, and finally removing the sheet material from said surface.

8. The process of manufacturing, as a continuous operation, an extended length of a laminated, sheet material containing a thermoset resin of the unsaturated polyester type, which comprises the steps of drying a plurality of webs of fibrous material, impregnating said webs with a low viscosity polyester resin while said resin is in the unreacted, liquid state, adjusting the resin content of said webs to a predetermined value and bringing said webs into superposed relation with each other and with at least one web or sheet which is unimpregnated with said resin, combining said webs by pressure to provide a laminated sheet, pressing said combined webs into adherent contact with a revolving, heated drum, maintaining said combined webs in adherent contact with said drum at least until the resin in contact with the surface of said drum is thermoset and finally forcibly removing the resulting laminated sheet material from said drum.

9. The process of manufacturing, as a continuous operation, an extended length of a laminated sheet material containing a thermoset resin of the unsaturated polyester type, which comprises the steps of drying a plurality of webs of fibrous material, impregnating said webs with a low viscosity polyester resin while said resin is in the unreacted, liquid state, effecting substantially complete removal of air from said webs, adjusting the resin content of said webs to a predetermined value and bringing said webs into superposed relation with each other and with at least one web or sheet which is unimpregnated with said resin, combining said webs by pressure to provide a laminated sheet, pressing said combined webs into adherent contact with a revolving, heated drum, maintaining said combined webs in adherent contact with said drum at least until the resin in contact with the surface of said drum is thermoset, and finally removing the resulting laminated sheet material from said drum.

10. The process of manufacturing, as a continuous operation, an extended length of laminated, sheet material containing a thermoset resin of the unsaturated polyester type, which comprises the steps of drying each of a plurality of webs of fibrous material to a moisture content which is less than about $3\frac{1}{2}\%$ by weight of the web being dried, impregnating the said dried webs with a low viscosity, polyester resin by a procedure which includes submersion of said webs in a bath of said resin which is in the unreacted, liquid state, effecting substantially complete removal of air from said webs during the impregnating operation, adjusting the resin content of said webs to a predetermined value, bringing said webs into superposed relationship with each other and combining said webs under pressure while said webs are still submerged in said bath of liquid resin, the amount of resin remaining in said webs following the impregnating and combining operations being sufficient to provide a surface film of resin on at least one surface of said combined webs, pressing said surface into adherent contact with a heated surface of large heat mass, maintaining said superposed webs in adherent contact with said surface at least until the resin film in contact with said surface is thermoset, and finally forcibly removing said sheet material from said surface.

11. The process of manufacturing, as a continuous operation, an extended length of laminated, sheet material containing a thermoset resin of the unsaturated polyester type, which comprises the steps of drying each of a plurality of webs of cellulosic sheet material to reduce the moisture content of said webs to a value which is less than about $3\frac{1}{2}\%$ by weight of the dried webs, impregnating said dried webs with low viscosity, polyester resin by a procedure which includes submerging said webs in, and moving said webs through, a bath of said resin which is in the unreacted state, said resin having a viscosity at 75° Fahrenheit of about 5 to 500 centipoises and having a gel point in the region of from about 190° to 215° Fahrenheit, effecting substantially complete removal of air from said webs while said webs are submerged in said resin, adjusting the resin content of said webs to a predetermined value by the application thereto of pressure, bringing said webs into superposed contact with each other while said webs are submerged in said resin bath, conducting said superposed webs from said resin bath into adherent contact with a heated, curing surface, the amount of resin remaining in the superposed webs following the impregnating and web superposing operations being sufficient to provide a surface film of resin at the surface of said webs which contacts said curing surface, maintaining said superposed webs in adherent contact with said curing surface at least until the resin in contact with that surface is thermoset, and finally forcibly removing said sheet material from said curing surface.

DONALD H. GRANGAARD.

References Cited in the file of this patent

UNITED STATES PATENTS

| Number | Name | Date |
|---|---|---|
| 1,427,477 | Kaufmann et al. | Aug. 29, 1922 |
| 1,776,586 | Heppes | Sept. 23, 1930 |
| 1,880,930 | Elbel | Oct. 4, 1932 |
| 2,158,754 | Hodgdon | May 16, 1939 |
| 2,180,723 | Schur | Nov. 21, 1939 |
| 2,264,522 | Grupe | Dec. 2, 1941 |
| 2,272,317 | Davies | Feb. 10, 1942 |
| 2,298,592 | Rowe | Oct. 13, 1942 |
| 2,430,479 | Pratt | Nov. 11, 1947 |
| 2,432,752 | Gray | Dec. 16, 1947 |
| 2,448,357 | Craig et al. | Aug. 31, 1948 |
| 2,496,911 | Green | Feb. 7, 1950 |
| 2,523,410 | Allard | Sept. 26, 1950 |
| 2,526,945 | Gray | Oct. 24, 1950 |
| 2,528,152 | Landgraf | Oct. 31, 1950 |